2 Sheets—Sheet 1.
S. CADDICK.
PUDDLING FURNACE.
No. 6,778. Reissued Dec. 7, 1875.
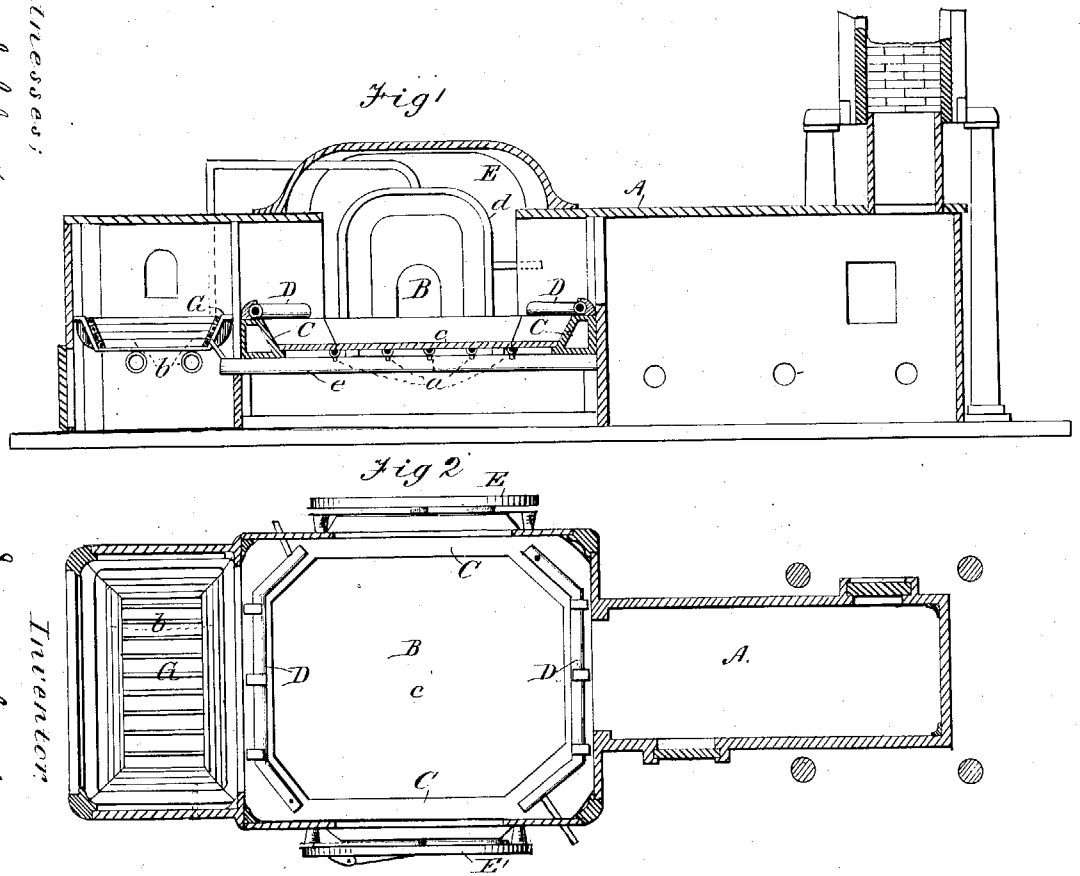
Witnesses;
Harry C. Clark
R. N. Dyer
Inventor
Samuel Caddick
by Geo. W. Dyer,
Att'y 2 Sheets—Sheet 2.

S. CADDICK.

PUDDLING FURNACE.

No. 6,778. Reissued Dec. 7, 1875.

Witnesses
Harry C Clark
R T Dyer

Inventor.
Samuel Caddick
by Geo. W. Dyer, Atty

UNITED STATES PATENT OFFICE.

SAMUEL CADDICK, OF PEMBROKE, MAINE.

IMPROVEMENT IN PUDDLING-FURNACES.

Specification forming part of Letters Patent No. 70,322, dated October 29, 1867; reissue No. 6,778, dated December 7, 1875; application filed October 3, 1874.

*To all whom it may concern:*

Be it known that I, SAMUEL CADDICK, of Pembroke, in the county of Washington and State of Maine, have invented a new and Improved Puddling-Furnace; and that the following is a full, clear, and exact description of the same, reference being had to the accompanying drawings, and to the letters of reference marked thereon, making a part of this specification.

This invention is in the nature of an improvement in puddling-furnaces; and my invention consists in providing the air-blast box with a flange to support the bottom of the furnace, and supporting the bottom, in turn, upon hollow bearers; in the means employed to protect the furnace-doors; in removable water-pipes arranged around the puddling-pit; in a peculiar water-casing to the fire-box; in the means employed in supporting the chimney; and in the combinations of the various parts, all as more fully hereinafter explained.

Figure 3:
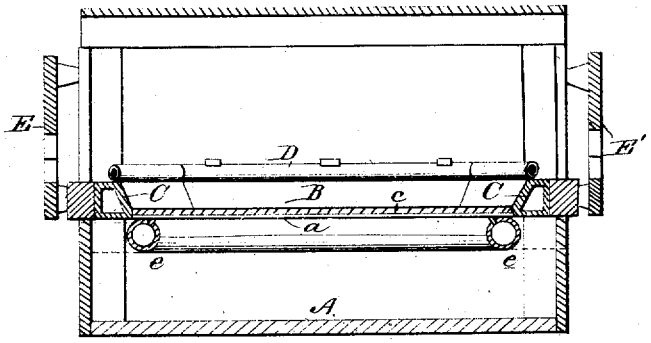
Figure 4:
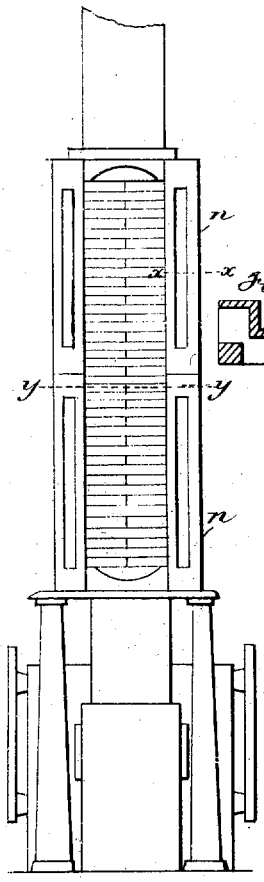
Figure 4A:
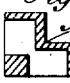
Figure 5:
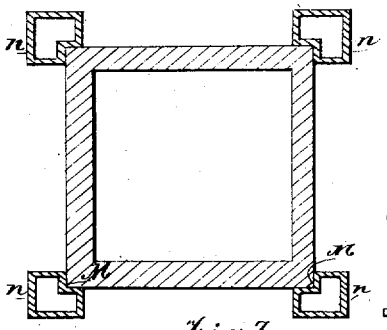
Figure 7A:
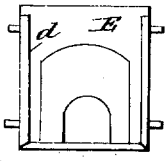
Figure 6:
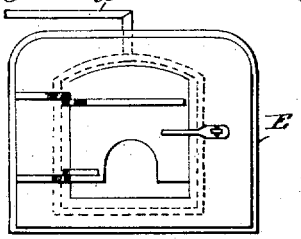
Figure 7:
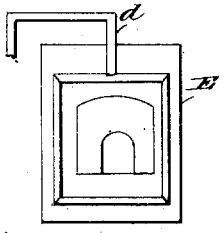
Figure 8:
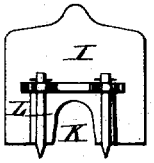
Figure 9:
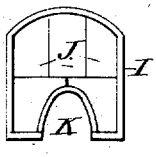
Figure 10:
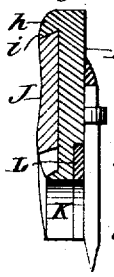

In the accompanying drawings, Figure 1 represents a central longitudinal section of my improved furnace; Fig. 2, a top view, with the stack and top of the furnace removed; Fig. 3, a transverse section through the center of the puddling-pit, looking toward the grate; Fig. 4, an end elevation of the furnace, showing the chimney or stack. Fig. 4ª is a cross-section of one of the skeleton corner-supports on the line *x x* in Fig. 4. Fig. 5 is a cross-section of the chimney or stack on the line *y y* in Fig. 4. Figs. 6, 7, and 7ª are views of the frame-work or mouths of the furnace and their doors and water-pipes. Figs. 8 and 9 are views of the puddling-door, and Fig. 10 a vertical central section of the same.

Similar letters of reference indicate like parts in the several figures.

A represents a puddling-furnace, which may be of any desired size, and constructed of the usual materials. Surrounding that part B of the furnace where the iron is puddled is a metallic chill, C. This chill is hollow, or formed with a continuous channel passing within it. On the top of the chill C, and surrounding it, are affixed, in any desirable way, water-pipes D, and to the under side of the bed-plate *c* are secured water-pipes *a*. E E′ represent the inner frame-work or mouths of the furnace. The fire grate or box is lined with a series of wrought-iron tubes, *b*, rectangular in vertical section, placed closely one above the other, so as to present a smooth internal surface, and are cooled by the passage of water through them in any convenient manner, thus presenting an iron surface cooled by water, instead of fire-brick, and preventing the accumulation of clinkers and other obnoxious débris upon the surfaces. Supporting the furnace proper on its under side are a series of tubular bearers, *e e*. These bearers may be connected in any suitable way with the tubes *b*, with the pipes D, as well as with the pipes *a*. The inner doors I, through which the iron is stirred or puddled, are formed on their inner side or face so that sections of fire-brick may be inserted therein, and held in position by a dovetailed or angular flange, *h*, formed on the inner edge of the door.

My puddling-furnace being constructed substantially as above described, its operation is as follows: The fire having been kindled on the grate G, the iron undergoing the process of puddling is placed in the bed B, and a blast being forced into the air-blast box is supplied in any usual manner to the fire-box. It will be seen, therefore, that the means of supplying the blast is efficacious in two respects. It constantly circulates within the chill a current of cool air, which reduces the temperature of the chill and preserves it from burning, and by the time the air has circulated around the chill it has become heated sufficiently to form, as it were, a hot-blast for the furnace-fire, and thereby effects a large saving in fuel, and consequent economy in the production of the iron.

In puddling-furnaces heretofore constructed the water-channels around the mouths of the furnace-doors, and beneath the puddling-pit and other places throughout the furnace, have been cast with the several parts, so that when these channels were burned up, or the plates were fractured, it became necessary to supply new plates with new water-channels at a considerable expense, besides interrupting the operation of the furnace.

By my method of having removable pipes I am enabled to avoid these inconveniences.

Secured to the bed-plate *c* are water-pipes

*a*. These pipes are cast into the bed or bottom of the furnace-plate, and then leading into and connecting with the tanks or chambers of the fire-grate, through the intervention of the tubular bearers, and then conducted off. These pipes receive their supply of water from any suitable water-supply pipe, and they discharge it into any suitable outlet. Surrounding the upper edge of the chill C is a water pipe or pipes, D. This may be one continuous pipe, or may be sections, and they are secured to the upper surface of the chill by brackets or lugs, or in any way, so that when the chill burns out or is fractured the water-pipes remain intact, and are readily adjusted to the new chill when fitted. This pipe receives its supply of water from any suitable water-supply pipe, and discharges it into any suitable outlet-pipe.

Instead of lining the inner face of the inner or protecting doors I with fire-brick in the ordinary manner, depending upon cement and iron straps to hold the fire-brick material in position, I cast or otherwise form this door with a flange, *h*, having formed in its inner face an inclined recess, *i*. The fire-brick J are molded with their edges at an angle that will fit into this inclined recess, so that when they are in position the last brick *j*, acting as a key, will hold them all firmly in position. The advantages of this method of lining the doors are, that any part of the brick-work that has been burned, warped, or otherwise destroyed, may with great facility be removed, and new sections replaced, without disturbing the whole lining, and also, the brick-work being confined by an equal pressure throughout, it is not so likely to warp and bulge by the action of the heat as it would otherwise do.

As is well known, the bit or orifice K, through which the puddling-irons are introduced, is rapidly worn away by the friction of the irons against it, in which case the door is generally discarded for a new one. By my improvement I affix to the front of the door a movable wrought-iron bit, L, so that as the bit becomes worn a new one may be replaced at once without disturbing the door. This bit may be attached by slides or lugs and bolts, or in any way.

The brick-work of the chimney-stack is supported by four skeleton columns, *u*, having L-shaped inner edges M, which fit against the corners of the stack. These columns may be connected at top and bottom by suitable plates or clamps.

The chill C is secured within the walls of the furnace in such manner that it may be readily removed when fractured, or otherwise injured, and a new chill inserted in its stead.

Having thus described my invention, what I claim as new, and desire to secure by Letters Patent, is—

1. In combination in a puddling-furnace, an air-blast box provided with a flange to support the bottom of the furnace, the furnace-bottom supported thereon, and hollow bearers upon which said bottom rests, all substantially as and for the purposes described.

2. In a puddling-furnace, the chill thereof provided with a water-pipe on its upper surface for cooling and protecting the same, separate from and independent of said chill, so that said pipe may be removed for repair without disturbing the chill, substantially as and for the purpose described.

3. The combination of the bed-plate water-pipes, suitably secured in or to the under side of the same, and water-pipes around the fire-box, substantially as described.

4. In combination, the tubular water-casing *b* of the fire-box and the hollow bearers *e*, substantially as described.

5. In combination with a furnace-chimney, the skeleton metallic corner-supports of the same, constructed substantially as described.

6. In combination, the bed-plate, and the hollow water-bearers *e* upon which it rests, substantially as described.

7. In a puddling-furnace, the doors thereof constructed with concave inner surfaces, and fitted with fire-brick having corresponding convex surfaces, in combination with angular flanges on the edges of the doors, substantially as and for the purposes described.

SAMUEL CADDICK.

Witnesses:
W. K. CAMERON,
WM. W. MCLAUCHLAN.